United States Patent Office 2,710,279
Patented June 7, 1955

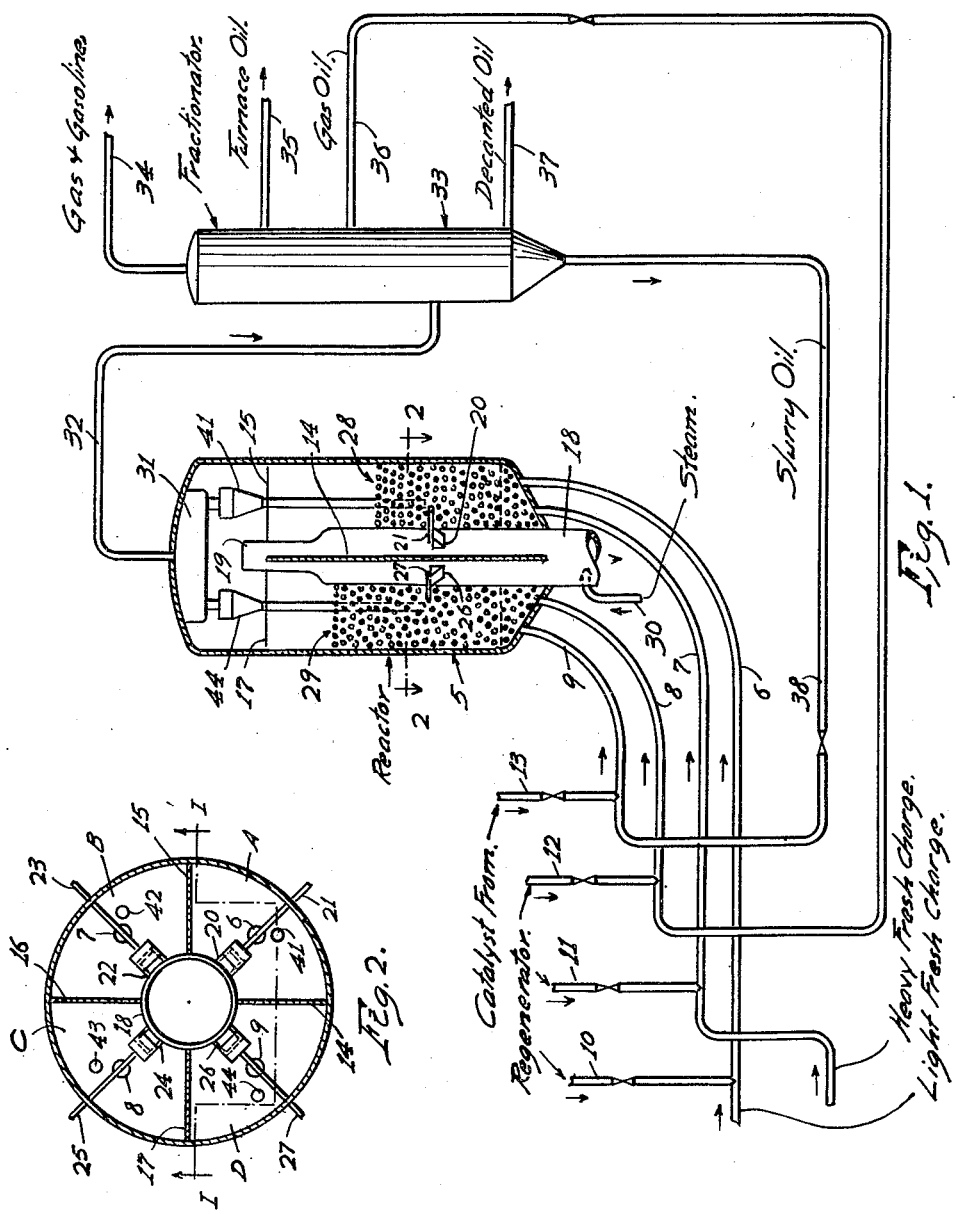

2,710,279

METHOD FOR CONDUCTING SEVERAL CATALYTIC HYDROCARBON CONVERSIONS IN A SINGLE REACTOR

Paul Siecke, Mount Lebanon Township, Allegheny County, Pa., assignor to Gulf Oil Corporation, Pittsburgh, Pa., a corporation of Pennsylvania Application June 19, 1952, Serial No. 294,390

1 Claim. (Cl. 196—52)

This invention relates to a method and apparatus for conducting catalytic conversions. More particularly, it is concerned with a method and apparatus for conducting catalytic conversions with finely divided catalyst particles which are maintained in suspension as fluidized catalyst particles.

In conducting catalytic conversions with hydrocarbon reactants in the presence of fluidized catalyst, considerable difficulty has been encountered in obtaining high yields of conversion products without excessive production of carbonaceous contaminants. For example, in conventional catalytic cracking in which a feed comprising a mixture of a number of relatively high-boiling hydrocarbon constituents is catalytically cracked by contact with fluidized cracking catalyst particles to yield relatively low-boiling hydrocarbon products it has frequently been observed that the refractory feed constituents such as the low-boiling materials are under-cracked to produce low yields of products, whereas the non-refractory feed constituents, such as certain higher boiling materials are overcracked and produce excessive amounts of coke. Operating in the afore-mentioned manner has resulted in undue catalyst regeneration requirements, excessive recycling of unconverted charge, and relatively low yields of valuable conversion products.

The process of my invention provides a method whereby the foregoing difficulties are avoided and optimum yields of valuable conversion products are obtained without excessive coking. My process is effected by mixing finely divided catalyst particles with each of a plurality of hydrocarbon fractions. Each such mixture is then continuously conducted to separate compartments of a vertically partitioned fluid catalytic reactor. The catalyst particles in each mixture are fluidized in the respective vertically partitioned compartments, and the hydrocarbon fraction in each compartment is catalytically converted through contact with the fluidized catalyst under preferential conditions. These preferential conditions are such that optimum catalytic conversion of each hydrocarbon fraction is effected. For example, in a catalytic cracking process in which a refractory hydrocarbon fraction occupied a given compartment, relatively severe cracking conditions such as a high temperature and/or a high catalyst to oil ratio would be maintained. Conversely, in a compartment containing a non-refractory hydrocarbon fraction, relatively mild cracking conditions would be used.

In a preferred modification of my process, the catalytic conversion products are continuously withdrawn from the upper portion of the catalytic reactor and the catalyst particles are continuously withdrawn from the vertically partitioned compartments. Preferably, the withdrawn catalyst particles are combined in a catalyst stripper and stripped of entrained hydrocarbons which are recovered.

The apparatus of my invention is especially adapted for conducting reactions in the presence of fluidized catalyst particles. It comprises a closed cylindrical vessel divided into a plurality of vertical compartments by vertical partitions positioned within the lower portion of the vessel, which partitions extend to the bottom of the vessel. Each of the vertical compartments within the vessel is adapted to contain dense phase fluidized catalyst particles, and is provided with inlet means for adding catalyst and feed to the compartment. The upper portion of the vessel is provided with outlet means. In a preferred modification the vessel is also provided with a stripping chamber having means for stripping catalyst particles of entrained fluids, such as entrained hydrocarbons, and for conveying the stripped fluidized particles to the upper portion of the vessel. This stripping chamber is positioned intermediately with respect to the vertical partitions. The vessel is also provided with means for conveying catalyst particles from each of the compartments to the stripping chamber. Preferably, the stripping chamber is medially positioned with respect to the vertical partitions.

My invention has maximum utility with endothermic chemical reactions such as the catalytic cracking of hydrocarbons. By effecting such reactions in a vertically partitioned reactor the loss of heat due to radiation is minimized, since the vertical partitions form a common wall between compartments. Correspondingly, the relative percentage of each compartment's shell surface exposed to the atmosphere is less. Inasmuch as radiant heat loss to the atmosphere normally accounts for a substantial percentage of the total heat loss, it is seen that the heat loss from this source is substantially reduced. By reducing the heat loss, closer regulation of the catalytic conversion conditions can be effected.

The process and apparatus of my invention will be more readily understood by reference to the accompanying figures, which are hereby incorporated into my application and made a part thereof.

Figure 1 is a diagrammatic vertical sectional view of an embodiment of my invention with the view of reactor 5 taken along line 1—1 of Figure 2.

Figure 2 is a horizontal sectional view of the reactor of Figure 1 taken along line 2—2 of Figure 1.

Referring to Figures 1 and 2, the reactor of my invention, comprising a closed cylindrical vessel, is represented by the numeral 5. Four feet inlet lines 6, 7, 8, and 9 enter reactor 5 at its base. These feed inlet lines are each provided with a catalyst conduit, namely catalyst conduits 10, 11, 12, and 13 respectively for feed inlet lines 6, 7, 8, and 9. With special reference to Figure 2, it is seen that each of feed inlet lines 6, 7, 8, and 9 enters separate respective compartments A, B, C, and D of reactor 5. These compartments are formed by vertical partitions 14, 15, 16, and 17 which extend radially from catalyst stripper 18 and vent 19 to the reactor walls, and upwardly from the reactor bottom to a level near the top of vent 19. Each compartment is provided with an individual entrance through which a regulated flow of catalyst is transferred into catalyst stripper 18. Thus in compartment A, catalyst entrance 20 is provided with a slide valve 21 which regulates the rate of catalyst flow from the compartment into catalyst stripper 18. Compartments B, C, and D are provided respectively with catalyst entrance 22 and slide valve 23, catalyst entrance 24 and slide valve 25, and catalyst entrance 26 and slide valve 27.

The level of catalyst in compartment A is shown in Figure 1 by the level indicated by the head of the arrow designated 28 and the level of catalyst in compartment D is shown by the head of the arrow designated 29. In order to permit better observation of apparatus parts, the beds of catalyst are not shown in Figure 2.

Steam inlet line 30 introduces steam into catalyst stripper 18 and comprises means for stripping catalyst within catalyst stripper 18 of entrained fluids and conveying the stripped fluids to the upper portion of the reactor through vent 19. Outlet means for the reactor comprises a plenum chamber 31 to which are attached four cyclone separators, one for each of compartments A, B, C, and D. These cyclone separators are respectively designated 41, 42, 43, and 44. Only the dip legs for cyclone separators 42 and 43 are shown in the accompanying drawings, namely in Figure 2. The dip legs for each of these cyclone separators terminate in their respective reactor compartments within the catalyst bed. Conduit 32 conveys products and unreacted feed from plenum chamber 31 out of reactor 5.

As shown in Figure 1, conduit 32 enters fractionator 33 which is provided with conduits positioned at different heights for removing various distillate fractions. The distillate fractions are removed according to their boiling point, with the lowest boiling materials being removed through conduit 34 and the higher boiling fractions through respective conduits 35, 36, 37, and 38. In the modification shown in Figure 1, the distillate fraction from conduit 36 is introduced into feed inlet 8, and the slurry oil from conduit 38 is introduced into feed inlet 9.

In order to illustrate the process of my invention, reference should be had to the system set forth in accompanying Figure 1. The process embodiment which I shall describe is the catalytic cracking of a West Texas crude. The West Texas crude is fractionated prior to being utilized in my process, and the light fresh charge oil and heavy fresh charge oil fractions are utilized as feed. The inspection of these fractions is as follows:

|  | Light Fresh Charge Oil | Heavy Fresh Charge Oil |
| --- | --- | --- |
| A. P. I. Gravity | 35 | 23 |
| Distillation: |  |  |
| Over Point ° F | 420 | 600 |
| 50% ° F | 520 | 800 |
| 90% ° F | 600 | 925 |
| End Point ° F | 625 | 1,000 |
| Aniline Point ° F | 145 | 180 |

Both the light fresh charge oil which is introduced into the system through feed inlet line 6 and the heavy fresh charge oil which is introduced into the system through feed inlet line 7 are heated before being added to the feed inlet line. Hot regenerated fluid cracking catalyst from the regenerator (not shown) plus a minor amount of fresh fluid cracking catalyst is introduced into feed inlet line 6 through catalyst conduit 10, and into feed inlet line 7 through catalyst conduit 11. Any suitable fluid cracking catalyst can be employed in the process of my invention. Thus any of the conventional synthetic silica-alumina cracking catalysts can be employed, or if desirable a fluid cracking catalyst derived from an acid-treated clay can be used. Examples of such acid-treated clays which have found utility as cracking catalysts include certain acid-activated montmorillonite and halloysite clays. In the instant example a synthetic silica-alumina cracking catalyst comprising about 88 per cent silica and 12 per cent alumina is used.

A gas oil recycle fraction from fractionator 33 is introduced through conduit 36 into feed inlet line 8. This gas oil recycle fraction may be preheated by a preheater (not shown) in feed inlet line 8. The inspection of the gas oil recycle fraction is as follows:

Gas oil recycle fraction
A. P. I. gravity _____ 23
Distillation:
  Over point _____ ° F__ 600
  50% _____ ° F__ 775
  90% _____ ° F__ 875
  End point _____ ° F__ 900
  Aniline point _____ ° F__ 165

The gas oil recycle fraction in line 8 is joined by hot regenerated catalyst from catalyst conduit 12. Recycle slurry oil from conduit 38 of fractionator 33 is introduced into feed inlet line 9 wherein it may undergo preheating (by means not shown). This recycle slurry oil has the following inspection:

Recycle slurry oil
A. P. I. gravity _____ 15
Distillation:
  Over point _____ ° F__ 650
  50% _____ ° F__ 850
  90% _____ ° F__ 900
  End point _____ ° F__ 925

The recycle slurry oil in feed inlet line 9 is joined by hot regenerated catalyst from catalyst conduit 13.

Except for mechanical breakdown, overhauling and the like, the addition of hydrocarbon fractions and catalyst to the feed inlet lines is continuous. However, to adjust for changes in feed composition, activity of catalyst, etc. the ratio of catalyst to feed in the feed inlet lines can be continually adjusted. Preferably, this is effected by automatic regulators, such as electrically or pneumatically controlled valves.

The light fresh charge oil fraction and catalyst mixture from feed inlet line 6 is introduced into compartment A of reactor 5 and is maintained under relatively severe catalytic cracking conditions comprising a temperature of about 930° F., a catalyst to oil ratio of about 12 and a space velocity of one pound of oil fraction per pound of catalyst per hour. The heavy fresh charge oil fraction and catalyst mixture from feed inlet line 7 is introduced into compartment B under less severe catalytic cracking conditions namely a temperature of about 920° F., a catalyst to oil ratio of 10 and a space velocity of 1.2. The refractory gas oil recycle fraction and catalyst from feed inlet line 8 are introduced into compartment C under severe catalytic cracking conditions comprising a temperature of about 940° F., a catalyst to oil ratio of 14 and a space velocity of 1.0. The highly refractory slurry oil and catalyst from feed inlet line 9 are introduced into compartment D under severe catalytic cracking conditions comprising a temperature of 940° F., a catalyst to oil ratio of 14, and a space velocity of 0.8.

Under the afore-mentioned conditions, which are preferential for each fraction, optimum catalytic cracking of each fraction is secured. Thus the yield of desirable liquid low-boiling hydrocarbon products such as gasoline can be increased, and the coke lay-down on the catalyst reduced. However, some coke lay-down on the catalyst is inevitable, and as this results in a decrease in the cracking activity of the catalyst, regeneration of the catalyst becomes necessary.

The products and unreacted feed are continuously withdrawn overhead from each of the compartments and commingle in the upper portion of reactor 5. From the upper portion of reactor 5 the products and unreacted feed pass through cyclone separators 41, 42, 43 and 44 which return entrained catalyst particles to respective reactor compartments A, B, C and D, and convey products and unreacted feed to plenum chamber 31 and then to conduit 32.

From conduit 32 the products and unreacted feed enter fractionator 33 wherein they are fractionated into five fractions. The lowest boiling fraction, which comprises low-boiling gaseous hydrocarbons and gasoline, is withdrawn overhead from fractionator 33 through conduit 34. The next higher boiling fraction comprising the furnace oil fraction is withdrawn through conduit 35. The next higher boiling fraction, comprising the gas oil fraction, is recycled from conduit 36 through feed inlet line 8, and the bottoms from the fractionator, comprising slurry oil, is recycled from conduit 38 through feed inlet line 9 as has heretofore been described. The intermediate boiling fraction between the gas oil and the slurry oil, comprising the decanted oil fraction, is withdrawn from the fractionator through conduit 37.

The withdrawn fractions, namely the gas and gasoline fractions in conduit 34, the furnace oil fraction in conduit 35, and the decanted oil fraction in conduit 37, are removed from the system and may undergo processing in external equipment (not shown).

Carbonaceously contaminated catalyst is continuously withdrawn from each of compartments A, B, C, and D through respective catalyst entrances 20, 22, 24 and 26. The rate of catalyst withdrawal from compartment A through catalyst entrance 20 is regulated by slide valve 21, from compartment B through catalyst entrance 22 by slide valve 23, from compartment C through catalyst entrance 24 by slide valve 25; and from compartment D through catalyst entrance 26 by slide valve 27. The withdrawn catalyst is collected in catalyst stripper 18, wherein it is stripped of entrained hydrocarbons by means of stripping steam introduced through steam inlet line 30. The stripping steam also serves to convey the stripped hydrocarbons up through vent 19 to the stop of reactor 5 where the stripped hydrocarbons join the commingled products and unreacted feed from the compartments, and leave the reactor through cyclone seperators 41, 42, 43 and 44, plenum chamber 31 and conduit 32. The stripped catalyst is removed from catalyst stripper 18 (by means not shown) and passed to a regenerator (not shown).

In the regenerator the activity of the catalyst is restored by oxidative combustion of the carbonaceous contaminants. This regeneration is advantageously effected in the conventional manner through the employment of oxidation combustion temperatures of the order of 1000° to 1200° F. Inasmuch as catalytic cracking is an endothermic reaction, a significant portion of the heat requirements for the reaction can be supplied by utilizing the hot catalyst from the regenerator as a source of heat. Minor amounts of fresh catalyst may be added to the catalyst stream from the regenerator to replace catalyst lost by attrition and permanent deactivation.

While the character of the invention has been described in detail, this has been done by way of illustration only, and with the intention that no limitation should be imposed on the invention thereby. It will be apparent to those skilled in the art that numerous modifications and variations may be effected in the practice of the invention, and accordingly these modifications and variations should be construed as included within the scope of the claims appended hereto. By way of example, in place of the four-compartmented reactor shown in the accompanying figures, a reactor having a larger or smaller number of compartments can be used. Furthermore, the addition of automatic regulators, flow controllers, and other processing equipment readily apparent to one skilled in the art should be construed as included within the system shown in accompanying Figure 1. Moreover, while I have disclosed the process of my invention as applied to catalytic cracking, it is to be understood that it can also be applied to other catalytic processes employing fluidized catalyst. In addition to the foregoing, other process variables can be employed even when the process of my invention is applied to the catalytic cracking of high-boiling hydrocarbons. Thus, other temperatures, catalyst-to-oil ratios, space velocities, etc., can be utilized as will be readily apparent to one skilled in the art.

The process of my invention permits optimum catalytic conversion conditions to be empolyed for each of a plurality of hydrocarbon fractions. Moreover, the loss of heat due to radiation is materially reduced. This permits better control of the heat balance with resultant higher yields and/or superior reaction products.

The apparatus of my invention possesses a number of advantages over conventional fluid catalytic equipment. It is cheaper to construct than an equivalent number of individual reactors. In addition, the weight requirements of construction materials, such as alloy steels, are materially reduced. The number of required overhead lines, and catalyst strippers is also less.

I claim:

In a fluidized catalytic process for the conversion of hydrocarbons in which finely divided catalyst particles are mixed with each of a plurality of separate hydrocarbon fractions, the hydrocarbon fractions are passed in parallel streams through compartments within a single reactor with only a single fraction passing through each compartment, a fluidized bed of catalyst particles is maintained within each compartment, each of said fractions is cracked at preferential conditions of temperature, catalyst to hydrocarbon ratio, and space velocity, catalyst is withdrawn from each of the compartments, and the reaction products from the compartments are mixed and discharged from the reactor through a common outlet, the improvement comprising maintaining the preferential space velocity in each of the separate compartments independently of the other compartments by adjustment of the rate of catalyst withdrawal from each of the compartments to adjust the height of the fluidized bed of catalyst in each compartment.

References Cited in the file of this patent

UNITED STATES PATENTS

| | | |
|---|---|---|
| 2,460,404 | Ward | Feb. 1, 1949 |
| 2,617,708 | Peery | Nov. 11, 1952 |